(12) United States Patent
Charles

(10) Patent No.: US 9,757,906 B2
(45) Date of Patent: Sep. 12, 2017

(54) METHODS OF MAKING COMPOSITE CHARGES

(71) Applicant: The Boeing Company, Chicago, IL (US)

(72) Inventor: Jordan D. Charles, Seattle, WA (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 14/840,231

(22) Filed: Aug. 31, 2015

(65) Prior Publication Data

US 2017/0057180 A1  Mar. 2, 2017

(51) Int. Cl.
*B29C 70/30* (2006.01)
*B29C 70/38* (2006.01)
(Continued)

(52) U.S. Cl.
CPC .............. *B29C 70/30* (2013.01); *B29B 11/16* (2013.01); *B29C 70/38* (2013.01); *B29C 70/545* (2013.01);
(Continued)

(58) Field of Classification Search
CPC ... B29C 70/30; B29C 70/38; B29C 2793/009; B29C 2793/0027; B29C 2793/0081;
(Continued)

(56) References Cited

U.S. PATENT DOCUMENTS 5,397,415 A  3/1995  Manabe et al.
5,954,898 A  9/1999  McKague et al.
(Continued)

FOREIGN PATENT DOCUMENTS

DE  102009056994  6/2011
DE  102014015840  4/2015
(Continued)

OTHER PUBLICATIONS

European Patent Office, Extended European Search Report, EP 16 17 8590 (Feb. 14, 2017).
(Continued)

*Primary Examiner* — Vishal I Patel
(74) *Attorney, Agent, or Firm* — Walters & Wasylyna LLC

(57) ABSTRACT

A method (500) of making charges (160) comprises forming a combined perimeter shape (130) having no circumferentially enclosed openings by geometrically combining primary perimeter shapes (132), corresponding to perimeter shapes of the charges (160), and secondary perimeter shapes (133), such that symmetry axes (138) of the primary perimeter shapes (132) are parallel to each other, lateral edges (134) of the primary perimeter shapes (132), adjacent to each other, are at least partially contiguous, and all boundary edges of the combined perimeter shape (130) are either parallel or perpendicular to the symmetry axes (138) of the primary perimeter shapes (132). The method also comprises contiguously depositing prepreg tows (172) to form prepreg composite plies (126) and laminating the prepreg composite plies (126) together to form a precursor sheet (128) having a precursor combined perimeter shape (174) that circumscribes the combined perimeter shape (130). The method additionally comprises cutting the precursor sheet (128).

20 Claims, 10 Drawing Sheets

(51) Int. Cl.
    *B29C 70/54* (2006.01)
    *B29B 11/16* (2006.01)
(52) U.S. Cl.
    CPC ... *B29C 2793/009* (2013.01); *B29C 2793/0027* (2013.01); *B29C 2793/0081* (2013.01)
(58) Field of Classification Search
    CPC ....... B29C 70/545; B29C 70/46; B29C 43/12; B29C 70/48; B29C 70/78; B29B 11/16
    See application file for complete search history.

(56) References Cited

U.S. PATENT DOCUMENTS

| | | |
|---|---|---|
| 8,074,696 B2 | 12/2011 | Furukubo |
| 8,746,618 B2 | 6/2014 | Brook et al. |
| 2004/0026025 A1* | 2/2004 | Sana ............... B29C 70/386 156/256 |
| 2005/0211846 A1 | 9/2005 | Leon-Dufour et al. |
| 2015/0217488 A1* | 8/2015 | Allman ............ B29C 70/48 264/152 |

FOREIGN PATENT DOCUMENTS

| | | |
|---|---|---|
| EP | 2433781 | 3/2012 |
| EP | 2749405 | 7/2014 |
| JP | 2015085627 | 5/2015 |
| WO | 2011003844 | 1/2011 |

OTHER PUBLICATIONS

UK Intellectual Property Office, Combined Search and Examination Report under Sections 17 and 18(3), Application No. GB1611926.5, (Jan. 10, 2017).

* cited by examiner

FORMING COMBINED PERIMETER SHAPE (130) HAVING NO CIRCUMFERENTIALLY ENCLOSED OPENINGS BY GEOMETRICALLY COMBINING PRIMARY PERIMETER SHAPES (132), CORRESPONDING TO PERIMETER SHAPES OF CHARGES (160), AND SECONDARY PERIMETER SHAPES (133), SUCH THAT SYMMETRY AXES (138) OF PRIMARY PERIMETER SHAPES (132) ARE PARALLEL TO EACH OTHER, LATERAL EDGES (134) OF PRIMARY PERIMETER SHAPES (132), ADJACENT TO EACH OTHER, ARE AT LEAST PARTIALLY CONTIGUOUS, AND ALL BOUNDARY EDGES OF COMBINED PERIMETER SHAPE (130) ARE EITHER PARALLEL OR PERPENDICULAR TO SYMMETRY AXES (138) OF PRIMARY PERIMETER SHAPES (132)

- 514 ALL PRIMARY PERIMETER SHAPES (132) ARE DIFFERENT FROM ONE ANOTHER
- 516 AT LEAST ONE OF PRIMARY PERIMETER SHAPES (132) IS DIFFERENT FROM AT LEAST ANOTHER ONE OF PRIMARY PERIMETER SHAPES (132)
- 518 EACH OF PRIMARY PERIMETER SHAPES (132) HAS ONLY ONE SYMMETRY AXIS
- 520 ALL OF SECONDARY PERIMETER SHAPES (133) ARE DIFFERENT FROM ONE ANOTHER
- 522 EACH OF SECONDARY PERIMETER SHAPES (133) IS DIFFERENT FROM EACH OF PRIMARY PERIMETER SHAPES (132)
- 524 AT LEAST ONE OF SECONDARY PERIMETER SHAPES (133) HAS NO SYMMETRY AXIS 502  504

CONTIGUOUSLY DEPOSITING PREPREG TOWS (172) TO FORM PREPREG COMPOSITE PLIES (126) AND LAMINATING PREPREG COMPOSITE PLIES (126) TOGETHER TO FORM PRECURSOR SHEET (128) HAVING PRECURSOR COMBINED PERIMETER SHAPE (174) THAT CIRCUMSCRIBES COMBINED PERIMETER SHAPE (130)

- 508 PRECURSOR COMBINED PERIMETER SHAPE (174) IS LARGER THAN COMBINED PERIMETER SHAPE (130) BY AT MOST THIRTY PERCENT
- 510 PRECURSOR COMBINED PERIMETER SHAPE (174) IS LARGER THAN COMBINED PERIMETER SHAPE (130) BY AT MOST FIFTEEN PERCENT
- 512 PRECURSOR COMBINED PERIMETER SHAPE (174) IS LARGER THAN COMBINED PERIMETER SHAPE (130) BY AT MOST FIVE PERCENT
- 526 CONTIGUOUSLY LAYING DOWN PREPREG TOWS (172) TO FORM PREPREG COMPOSITE PLIES (126) IS PERFORMED USING AUTOMATED FIBER PLACEMENT MACHINE (236)

METHODS OF MAKING COMPOSITE CHARGES

BACKGROUND

Composite structures may be fabricated by laminating stacks of composite plies. Composite plies, also referred to as charges, may have different shapes. Typically, charges must individually be cut to shape from a sheet of material. This process is inefficient and generates a considerable amount of waste material.

SUMMARY

Accordingly, methods, intended to address at least the above-identified concerns, would find utility.

The following is an example, which may or may not be claimed, of the subject matter according the present disclosure.

One example of the present disclosure relates to a method of making charges. The method comprises forming a combined perimeter shape having no circumferentially enclosed openings by geometrically combining primary perimeter shapes, corresponding to perimeter shapes of the charges, and secondary perimeter shapes, such that symmetry axes of the primary perimeter shapes are parallel to each other, lateral edges of the primary perimeter shapes, adjacent to each other, are at least partially contiguous, and all boundary edges of the combined perimeter shape are either parallel or perpendicular to the symmetry axes of the primary perimeter shapes. The method also comprises contiguously depositing prepreg tows to form prepreg composite plies and laminating the prepreg composite plies together to form a precursor sheet, having a precursor combined perimeter shape that circumscribes the combined perimeter shape. The method additionally comprises cutting the precursor sheet.

BRIEF DESCRIPTION OF THE DRAWINGS

Figure 1B:
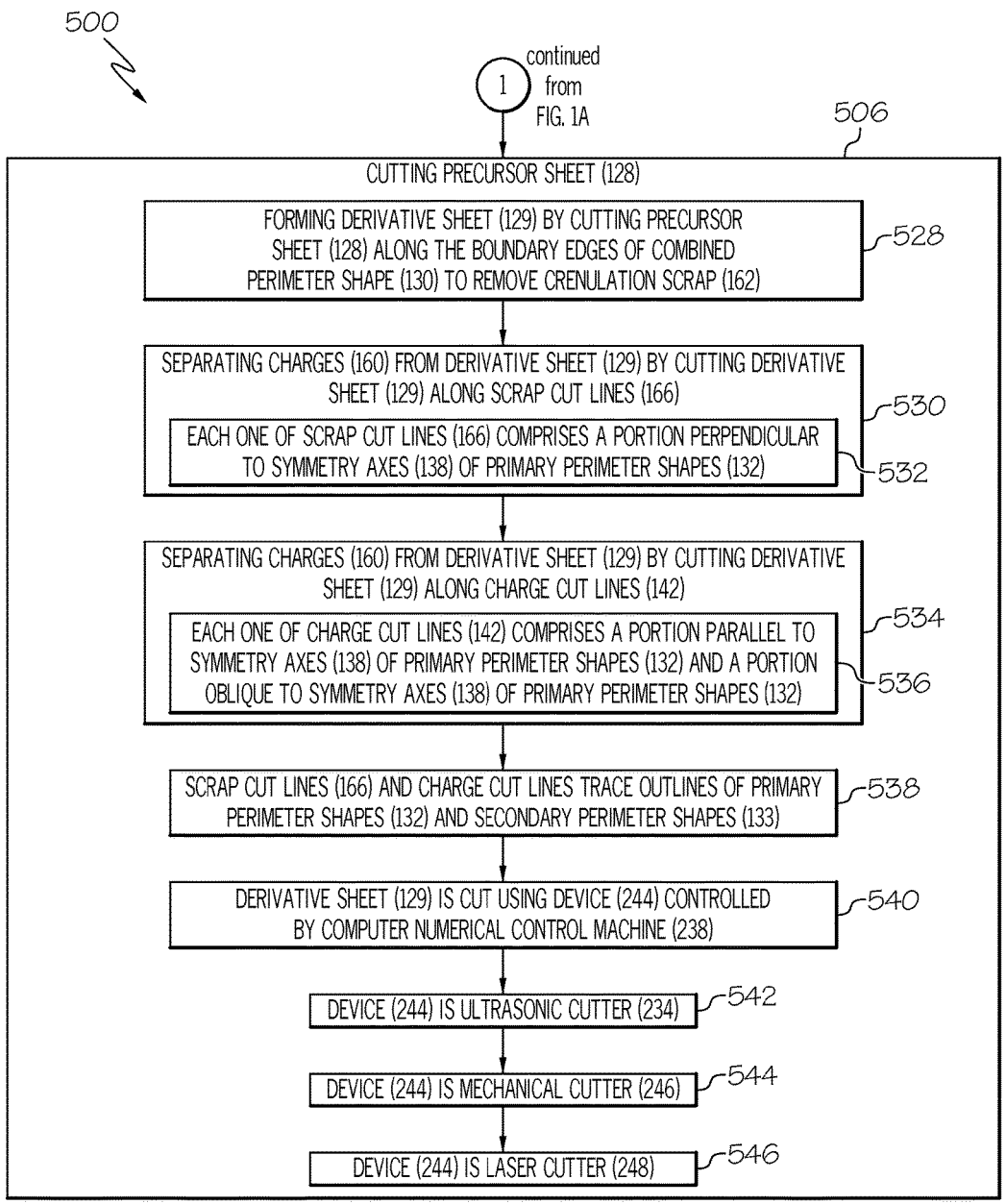
Figure 2:
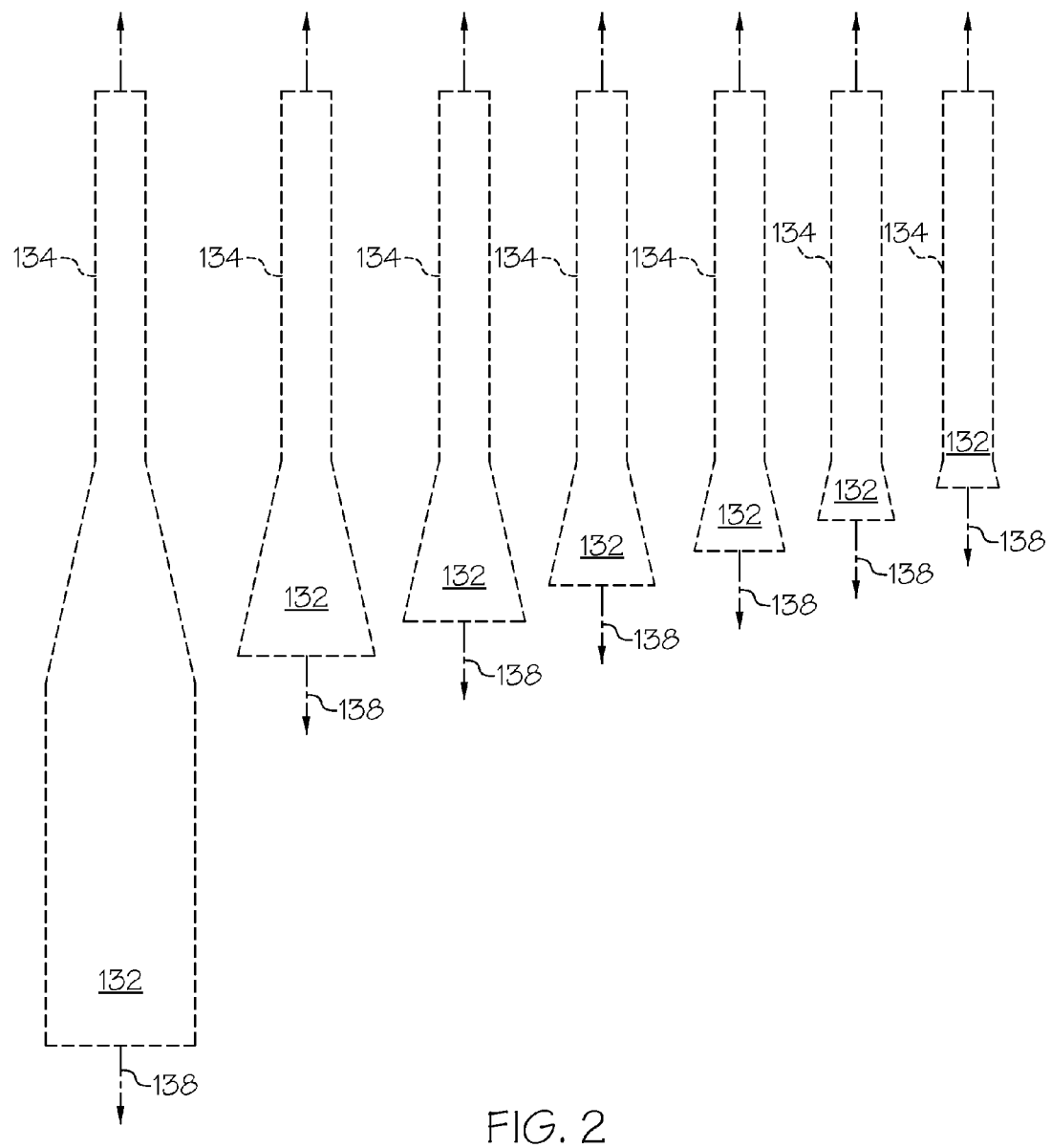
Figure 3:
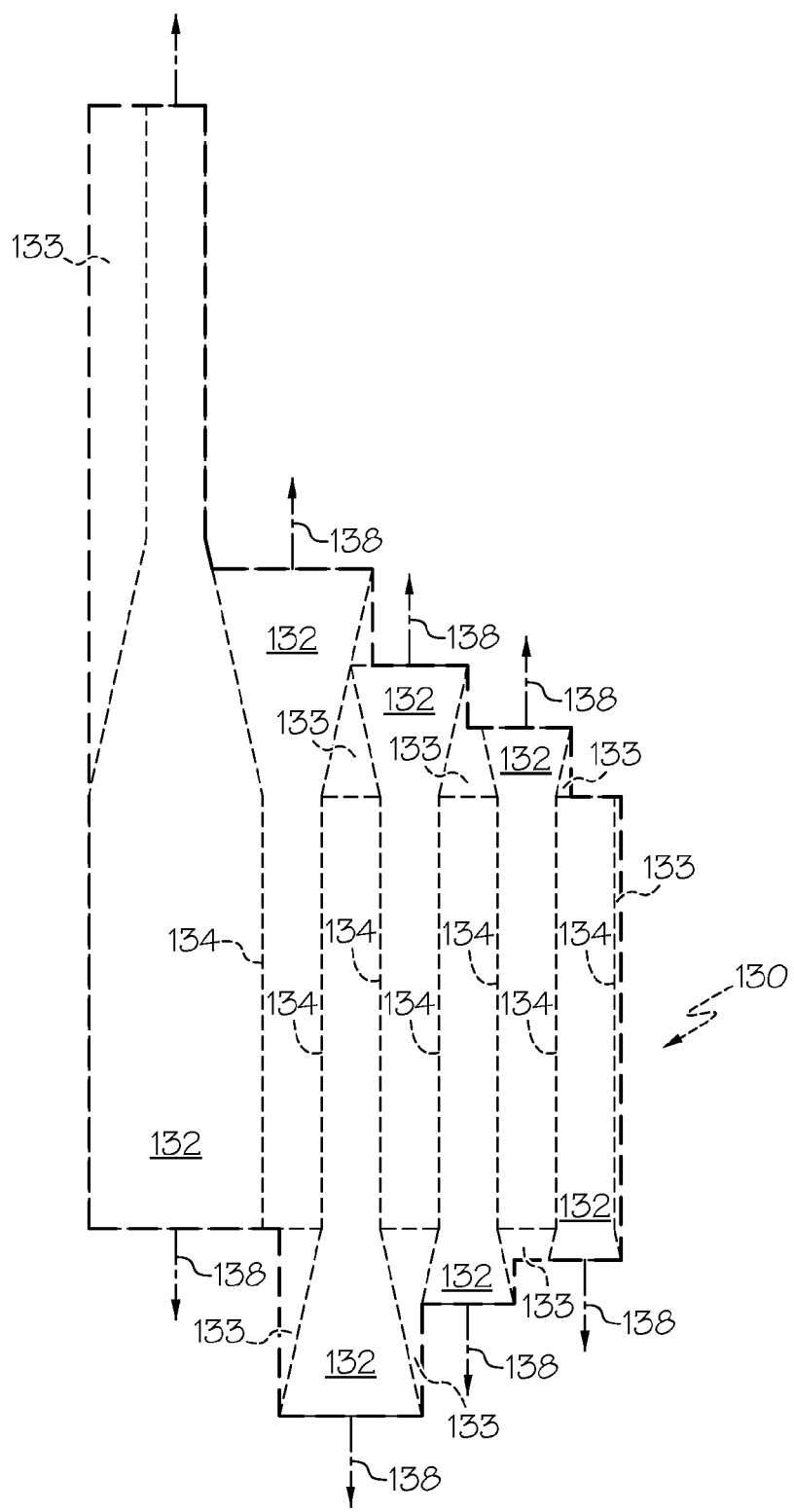
Figure 4:
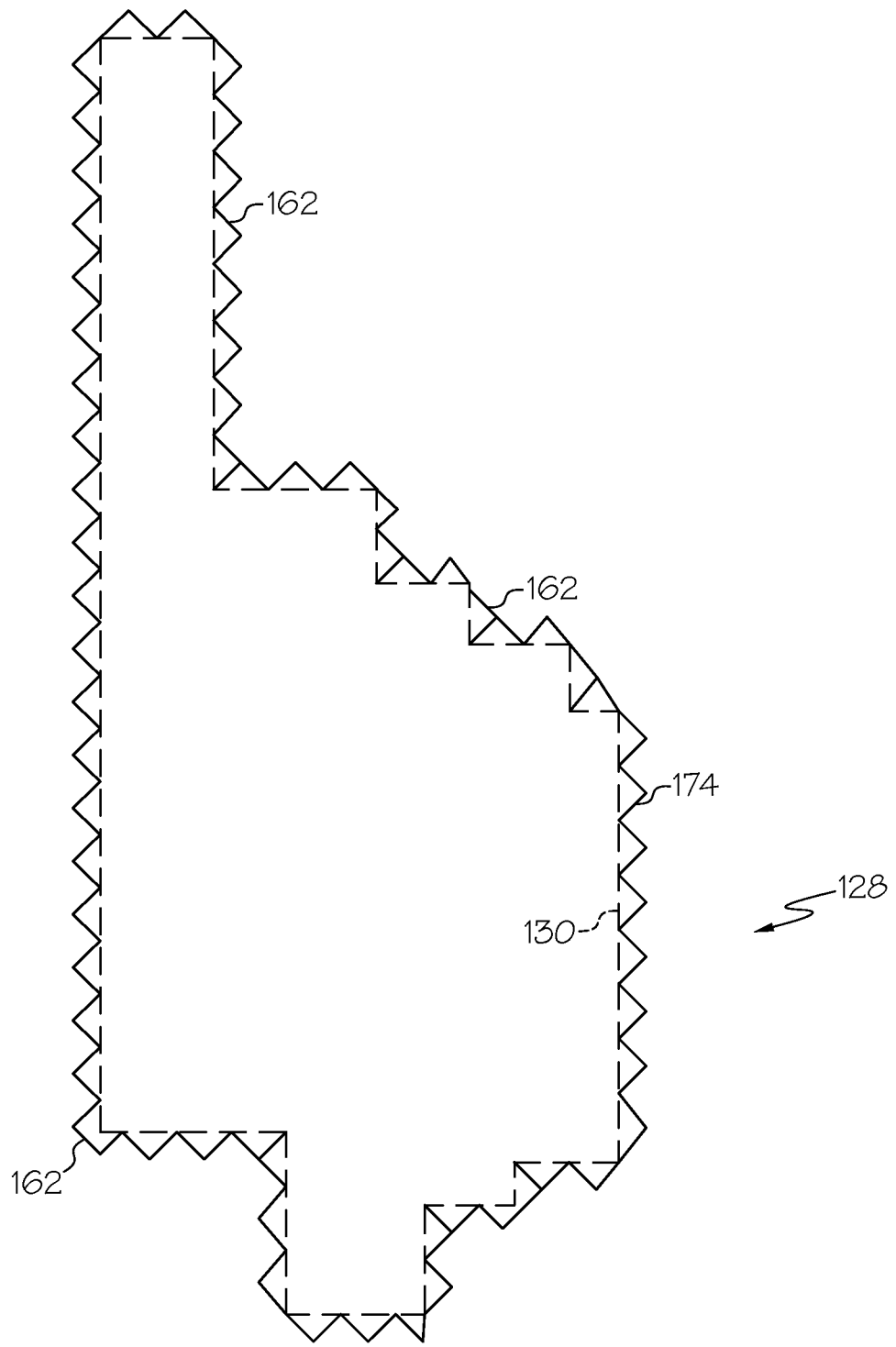
Figure 5:
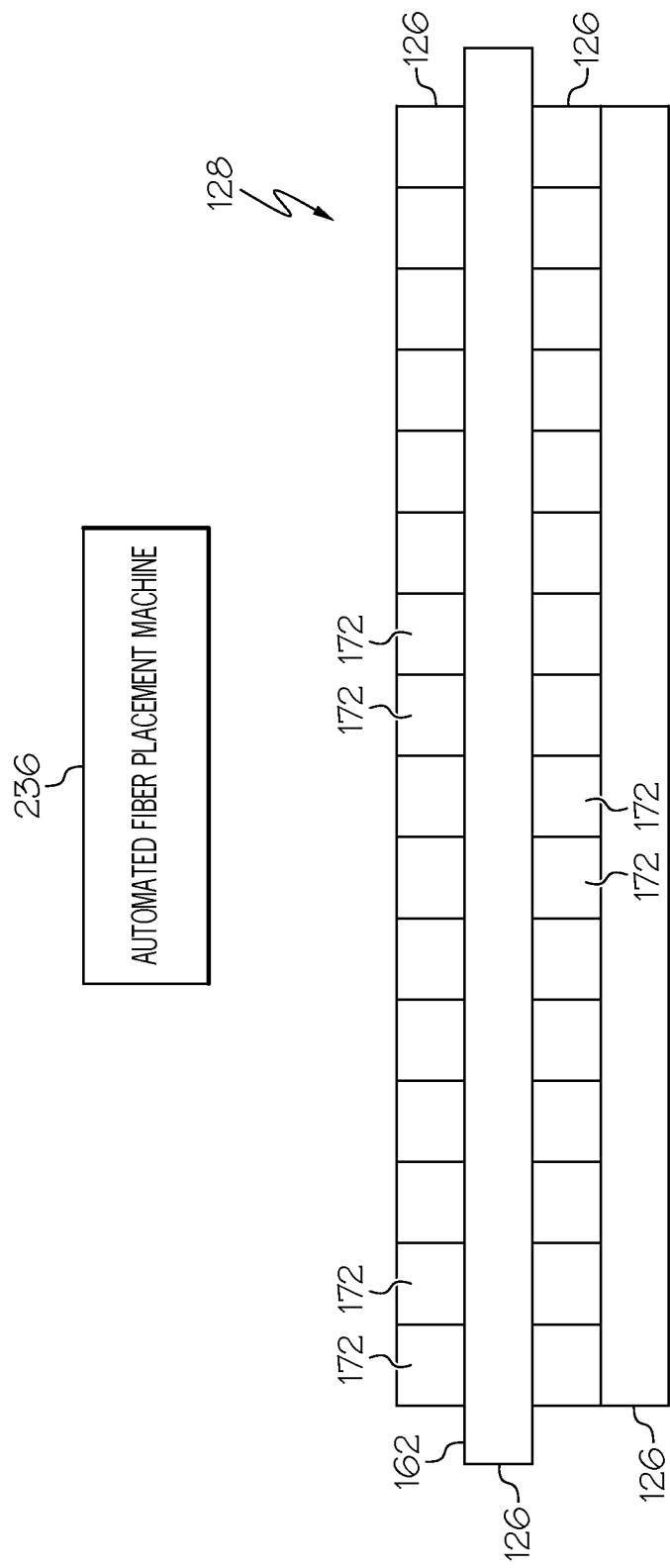
Figure 6:
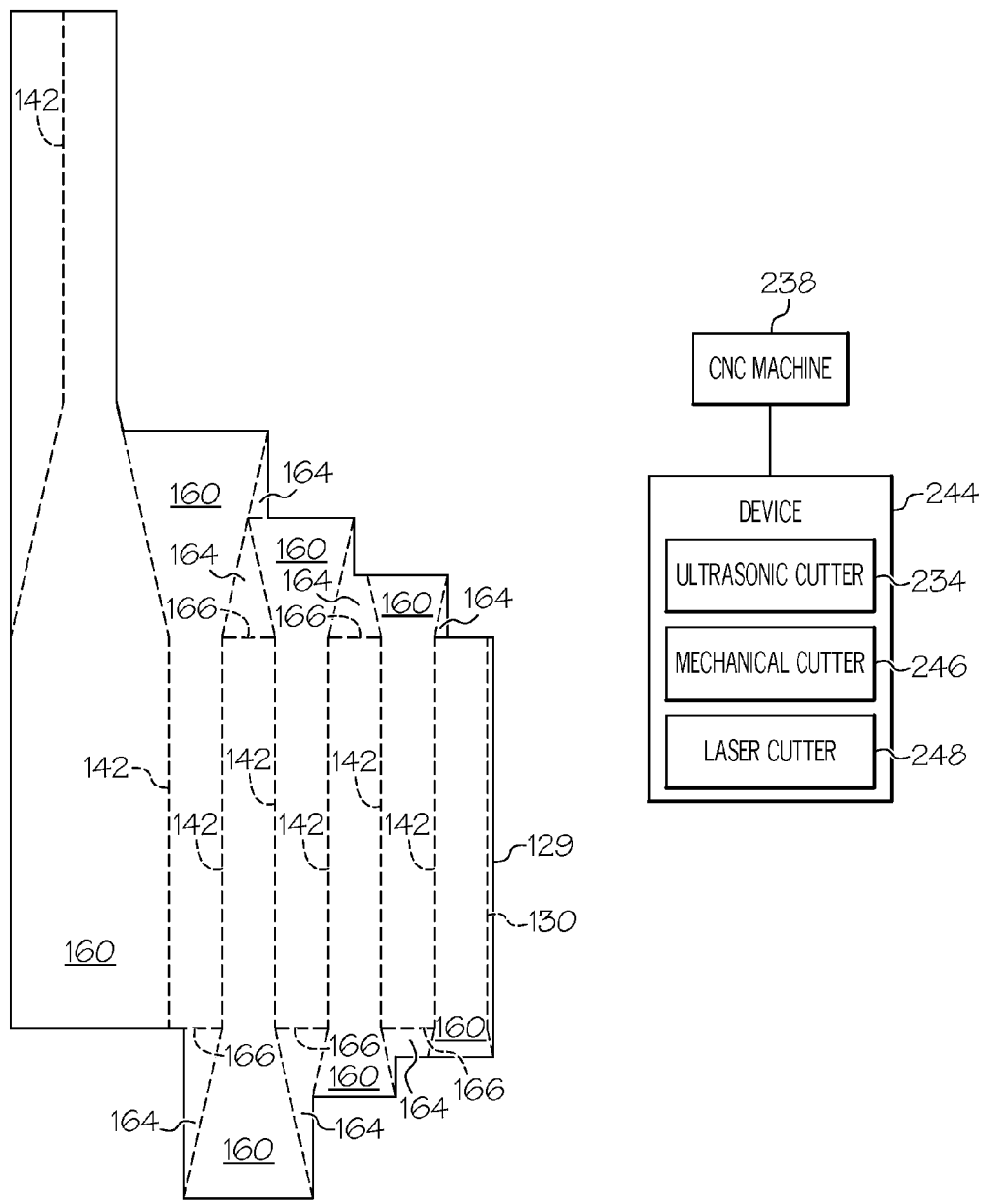
Figure 7:
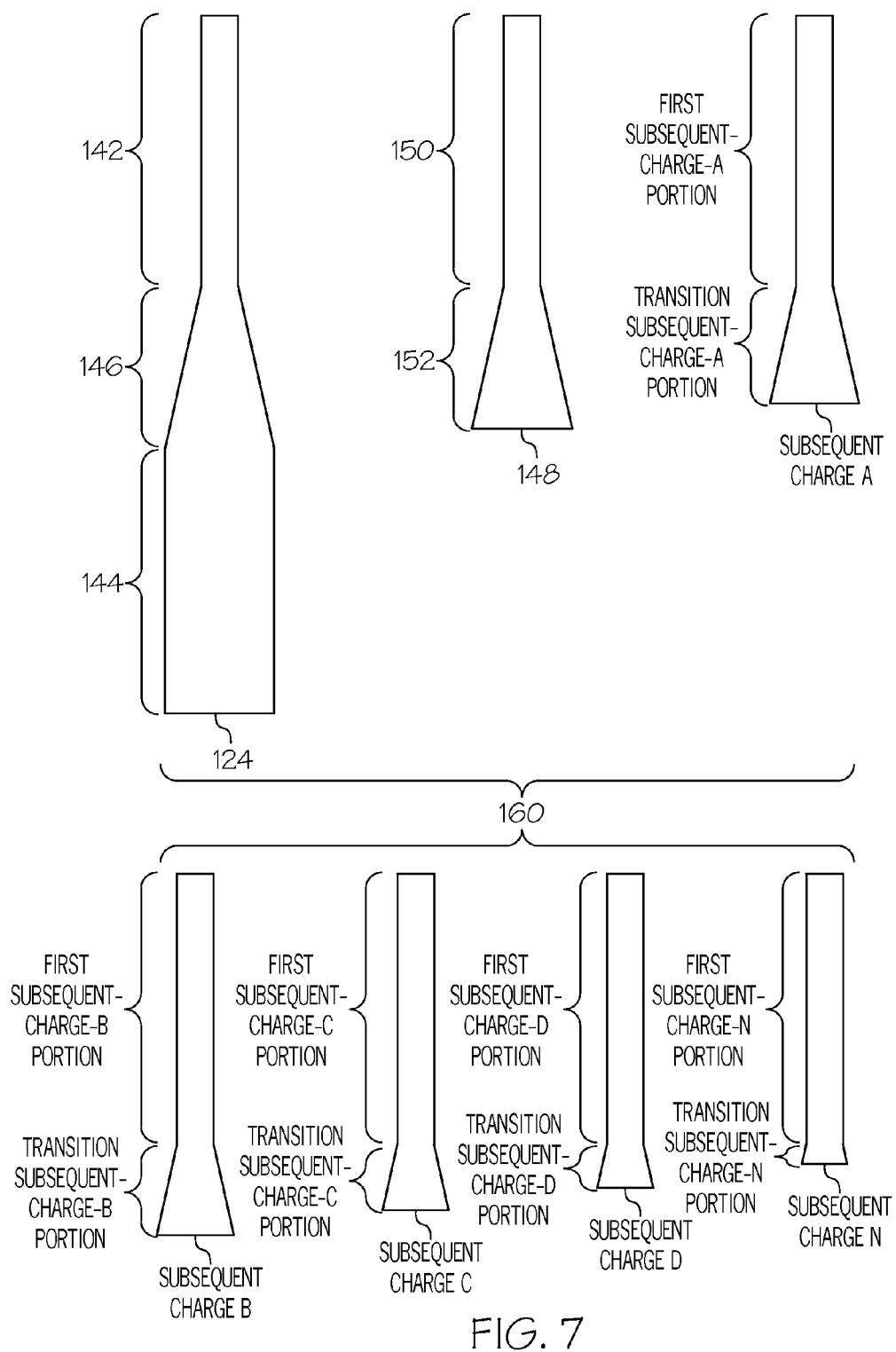
Figure 8:
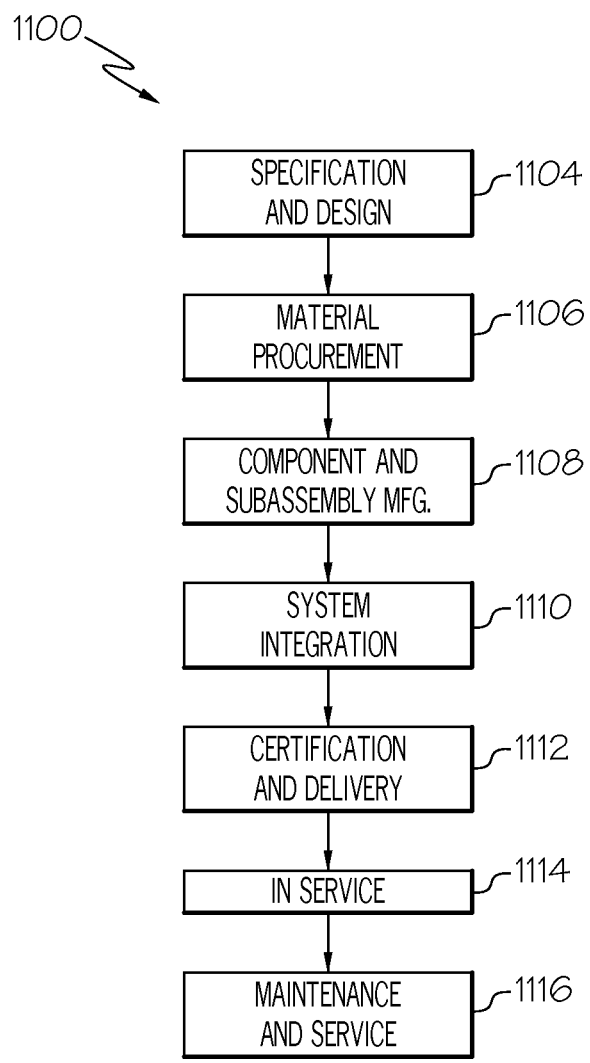

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a first portion of a block diagram of a method of making charges, according to one or more examples of the present disclosure;

FIG. 1B is a second portion of the block diagram of the method of making charges, according to one or more examples of the present disclosure;

FIG. 2 is a schematic top plan view of primary perimeter shapes corresponding to perimeter shapes of charges made according to one or more examples of the present disclosure;

FIG. 3 is a schematic top plan view of a combined perimeter shape comprising the primary perimeter shapes of FIG. 2, according to one or more examples of the present disclosure;

FIG. 4 is a schematic top plan view of a precursor sheet, according to one or more examples of the present disclosure;

FIG. 5 is a schematic side elevation view of the precursor sheet of FIG. 4, according to one or more examples of the present disclosure;

FIG. 6 is a schematic top plan view of a derivative sheet, according to one or more examples of the present disclosure;

FIG. 7 is a schematic top plan view of the charges made according to one or more examples of the present disclosure;

FIG. 8 is a block diagram of aircraft production and service methodology; and

Figure 9:
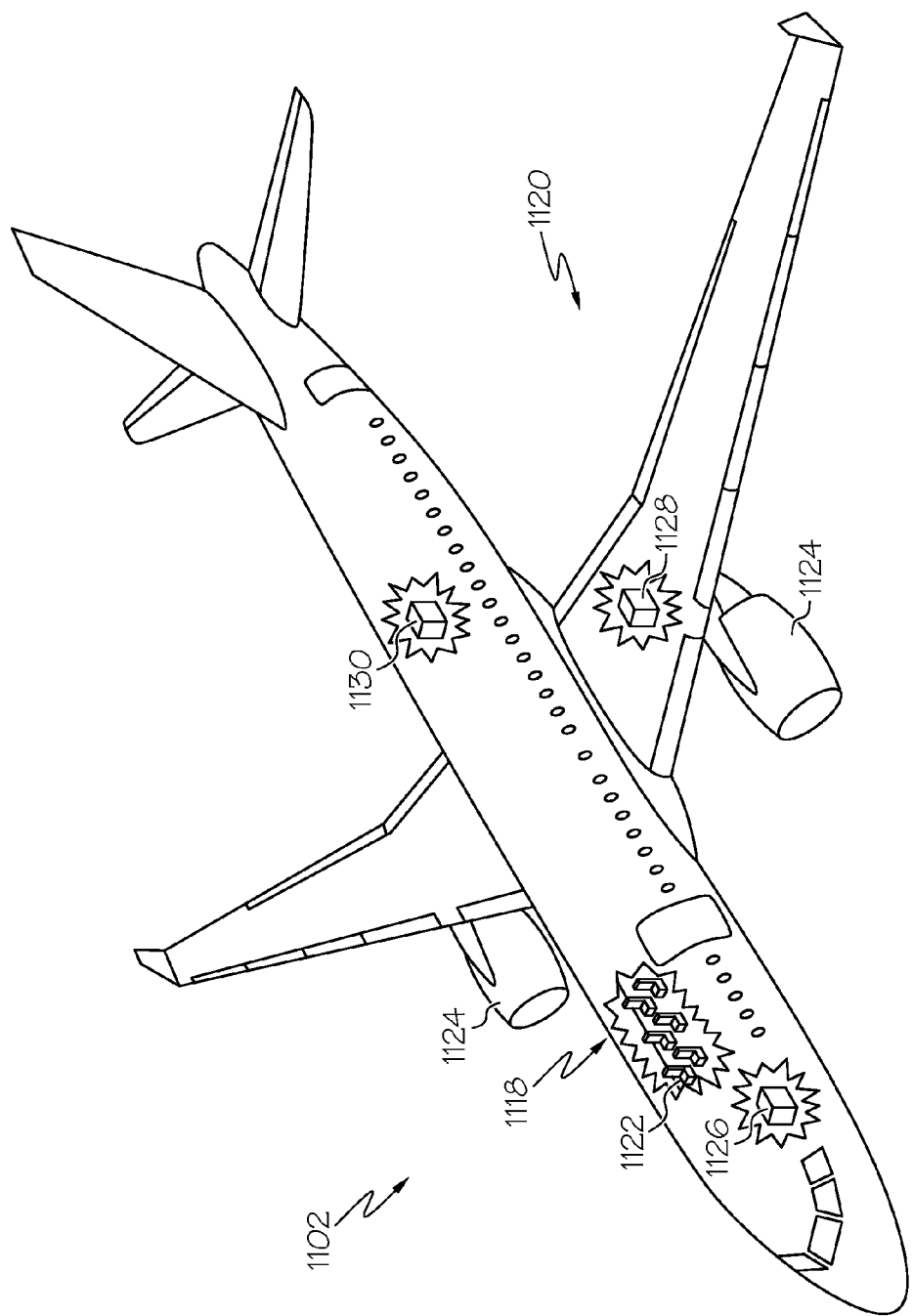

FIG. 9 is a schematic illustration of an aircraft.

DETAILED DESCRIPTION

In FIGS. 1A and 1B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 1A and 1B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring generally to, e.g., FIGS. 2-4 and particularly to FIGS. 1A and 1B, method 500 of making charges 160, is disclosed. Method 500 comprises (FIG. 1A, Bock 504) forming combined perimeter shape 130 having no circumferentially enclosed openings by geometrically combining primary perimeter shapes 132, corresponding to perimeter shapes of charges 160, and secondary perimeter shapes 133, such that symmetry axes 138 of primary perimeter shapes 132 are parallel to each other, lateral edges 134 of primary perimeter shapes 132, adjacent to each other, are at least partially contiguous, and all boundary edges of combined perimeter shape 130 are either parallel or perpendicular to symmetry axes 138 of primary perimeter shapes 132. The method also comprises (FIG. 1A, Block 504) contiguously depositing prepreg tows 172 to form prepreg composite plies 126 and laminating prepreg composite plies 126 together to form precursor sheet 128 having precursor combined perimeter shape 174 that circumscribes combined perimeter shape 130. The method additionally comprises (FIG. 1B, Block 506) cutting precursor sheet 128. The preceding subject matter of this paragraph characterizes example 1 of the present disclosure.

Forming and laminating prepreg composite plies 126 (FIG. 5) to form precursor sheet 128 (FIG. 4) having precursor combined perimeter shape 174 (FIG. 4) that circumscribes combined perimeter shape 130 (FIGS. 3, 4, and 6), formed from combining primary perimeter shapes 132 (FIGS. 2 and 3), corresponding to perimeter shapes of charges 160 (FIGS. 6 and 7), and secondary perimeter shapes 133 (FIG. 3), enables a decrease in waste and an increase in process time when cutting precursor sheet 128 (FIG. 4) to make charges 160 (FIG. 6).

Combined perimeter shape 130 (FIGS. 3, 4, and 6) having no circumferentially enclosed openings, holes, gaps, etc. forms or defines a solid shape (e.g., a shape lacking any openings interior to a perimeter edge), which represents the combination of primary perimeter shapes 132 (FIGS. 2 and 3), corresponding to perimeter shapes of charges 160 (FIGS. 6 and 7), and secondary perimeter shapes 133 (FIG. 3). Each of primary perimeter shapes 132, corresponding to perimeter shapes of charges 160, and secondary perimeter shapes 133 are contiguous (e.g., are touching and at least partially share a common border).

Alternatively, as one example, combined perimeter shape 130 (FIGS. 3, 4, and 6) may have circumferentially enclosed openings, holes, gaps, etc. Forming combined perimeter shape 130 having circumferentially enclosed openings may reduce the amount of material needed to make precursor sheet 128 (FIG. 4). As one example, one or more of the areas or portions of combined perimeter shape 130 formed by or defined by secondary perimeter shapes 133 (FIG. 3) may be openings (e.g., a lack of contiguously depositing prepreg tows 172 (FIG. 5) forming prepreg composite plies 126 (FIG. 5).

Orienting symmetry axes 138 (FIGS. 2 and 3) of primary perimeter shapes 132 (FIGS. 2 and 3) parallel to each other, lateral edges 134 (FIGS. 2 and 3) of primary perimeter shapes 132 adjacent to each other, and all boundary edges of combined perimeter shape 130 (FIGS. 3, 4, and 6) being either parallel or perpendicular to symmetry axes 138 of primary perimeter shapes 132 forms the contiguous combined perimeter shape 130.

In one example implementation, primary perimeter shapes 132 (FIGS. 2 and 3) are formed (e.g., generated) by generating a three-dimensional ("3D") model (not explicitly illustrated) representing a manufactured article (not explicitly illustrated) that will be made using charges 160 (FIGS. 6 and 7).

As one example, the 3D model includes a first model portion having a first cross-sectional profile that is constant along the first model portion. The 3D model also includes a second model portion having a second cross-sectional profile that is constant along the second model portion. The second cross-sectional profile of the second model portion is different from the first cross-sectional profile of the first model portion. The 3D model also includes a transition model portion tapering from the second model portion to the first model portion.

In one example implementation, primary perimeter shapes 132 are further formed by slicing the 3D model parallel to a plane extending longitudinally through the 3D model to form layers (not explicitly illustrated). Each one of the layers corresponds to one of primary perimeter shapes 132 (FIG. 2).

As one example, each layer formed by slicing the 3D model has a constant cross-sectional thickness. As one example, all of the layers have the same cross-sectional thickness.

In one example implementation, the article is made by stacking and laminating charges 160 (FIGS. 6 and 7). Thus, in accordance with the above example, article made from charges 160 is sized and shaped the same as 3D model. As one example, the article includes a first portion having a first cross-sectional profile that is constant along the first portion. The article also includes a second portion having a second cross-sectional profile that is constant along the second portion. The second cross-sectional profile of the second portion is different from the first cross-sectional profile of the first portion. The article also includes a transition portion tapering from the second portion to the first portion.

As one example, the article is a stiffener, which may be coupled to and stiffen a panel. As one example, the article is a stinger of an aircraft wing (e.g., a stiffener coupled to and stiffening a skin panel of the wing).

As best illustrated in FIG. 4, precursor combined perimeter shape 174 (FIG. 4) of precursor sheet 128 resembles combined perimeter shape 130, which reduces waste or scrap when cutting precursor sheet 128 to make charges 160 (FIGS. 6 and 7). Similarly, and as best illustrated in FIG. 3, combined perimeter shape 130 resembles the geometric combination of primary perimeter shapes 132 (FIG. 3). The waste or scrap produced during cutting of precursor sheet 128 to make charges 160 may include the portion of combined perimeter shape 130 defined by secondary perimeter shapes 133 (FIG. 3) and the portion of precursor perimeter shape 174 defined around combined perimeter shape 130.

As used herein, the terms "resemble" and "resembles" generally refer to having one or more features, boundary edges, and/or shapes in common.

As one example, precursor combined perimeter shape 174 (FIG. 4) and combined perimeter shape 130 (FIG. 4) share at least part of a common boundary edge (e.g., perimeter edge). As one example, combined perimeter shape 130 (FIG. 3) and the geometric combination of primary perimeter shapes 132 (FIG. 3) share at least part of a common boundary edge (e.g., perimeter edge).

Referring generally to, e.g., FIGS. 1B, 3, and 4 and particularly to FIG. 1A (Block 508), precursor combined perimeter shape 174 is larger than combined perimeter shape 130 by at most thirty percent. The preceding subject matter of this paragraph characterizes example 2 of the present disclosure, wherein example 2 also includes the subject matter according to example 1, above.

Precursor combined perimeter shape 174 being at most thirty percent larger than combined perimeter shape 130 further decreases the waste or scrap (e.g., from the area of secondary perimeter shapes 133) (FIG. 3) produced when cutting precursor sheet 128 to make charges 160.

Referring generally to, e.g., FIGS. 1B, 3, and 4 and particularly to FIG. 1A (Block 510), precursor combined perimeter shape 174 is larger than combined perimeter shape 130 by at most fifteen percent. The preceding subject matter of this paragraph characterizes example 3 of the present disclosure, wherein example 3 also includes the subject matter according to example 1, above.

Precursor combined perimeter shape 174 being at most fifteen percent larger than combined perimeter shape 130 further decreases the waste or scrap (e.g., from the area of secondary perimeter shapes 133) (FIG. 3) produced when cutting precursor sheet 128 to make charges 160.

Referring generally to, e.g., FIGS. 1B, 3, and 4 and particularly to FIG. 1A (Block 512), precursor combined perimeter shape 174 is larger than combined perimeter shape 130 by at most five percent. The preceding subject matter of this paragraph characterizes example 4 of the present disclosure, wherein example 4 also includes the subject matter according to example 1, above.

Precursor combined perimeter shape 174 (FIG. 4) being at most five percent larger than combined perimeter shape 130 (FIG. 4) further decreases the waste or scrap (e.g., from the area of secondary perimeter shapes 133) (FIG. 3) produced when cutting precursor sheet 128 (FIG. 4) to make charges 160 (FIG. 6).

Referring generally to, e.g., FIGS. 1B, 2, 3, and 6 and particularly to FIG. 1A (Block 514), all primary perimeter shapes 132 are different from one another. The preceding subject matter of this paragraph characterizes example 5 of the present disclosure, wherein example 5 also includes the subject matter according to any one of examples 1-4, above.

All of primary perimeter shapes 132 (FIG. 2) being different from one another enable each one of charges 160 (FIGS. 6 and 7) cut from precursor sheet 128 (FIG. 4) to have different perimeter shapes and, for example, be used to make an article made from charges 160 having a transitional shape.

Alternatively, as one example, all primary perimeter shapes 132 are the same as one another.

Referring generally to, e.g., FIGS. 1B, 2 and 3 and particularly to FIG. 1A (Block 516), at least one of primary perimeter shapes 132 is different from at least another one of primary perimeter shapes 132. The preceding subject matter of this paragraph characterizes example 6 of the present disclosure, wherein example 6 also includes the subject matter according to any one of examples 1-4, above.

At least one of primary perimeter shapes 132 (FIG. 2) being different from at least another one of primary perimeter shapes 132 enable at least one of charges 160 (FIGS. 6 and 7) cut from precursor sheet 128 (FIG. 4) to have a different perimeter shape from at least another one of charges 160 cut from precursor sheet 128.

Referring generally to, e.g., FIGS. 1B, 2, and 3 and particularly to FIG. 1A (Block 518), each of primary perimeter shapes 132 has only one symmetry axis. The preceding subject matter of this paragraph characterizes example 7 of the present disclosure, wherein example 7 also includes the subject matter according to any one of examples 1-6, above.

Each of primary perimeter shapes 132 (FIGS. 2 and 3) having only one symmetry axis enables symmetry axes 138 (FIGS. 2 and 3) of primary perimeter shapes 132 to be oriented parallel to each other when forming combined perimeter shape 130 (FIG. 3) such that and all boundary edges of combined perimeter shape 130 are either parallel or perpendicular to symmetry axes 138 of primary perimeter shapes 132.

The symmetry axis of each one of primary perimeter shapes 132 (FIGS. 2 and 3) is defined by a line extending through and dividing each one of primary perimeter shapes 132 into two sides. Each one of the two sides of each one of primary perimeter shape 132 (e.g., on either side of the symmetry axis) is a mirror image of each other.

Referring generally to, e.g., FIGS. 1B and 3 and particularly to FIG. 1A (Block 520), all of secondary perimeter shapes 133 are different from one another (Block 520). The preceding subject matter of this paragraph characterizes example 8 of the present disclosure, wherein example 8 also includes the subject matter according to any one of examples 1-7, above.

All of secondary perimeter shapes 133 being different from one another enables combined perimeter shape 130 to closely resemble a combination of primary perimeter shapes 132.

Secondary perimeter shapes 133 are defined by regions or portions of combined perimeter shape 130 formed between adjacent primary perimeter shapes 132 and/or between primary perimeter shapes 132 and combined perimeter shape 130. As one example, secondary perimeter shapes 133 enable all of the boundary edges of combined perimeter shape 130 to be either parallel or perpendicular to symmetry axes 138 of primary perimeter shapes 132.

Referring generally to, e.g., FIGS. 1B and 3 and particularly to FIG. 1A (Block 522), each of secondary perimeter shapes 133 is different from each of primary perimeter shapes 132. The preceding subject matter of this paragraph characterizes example 9 of the present disclosure, wherein example 9 also includes the subject matter according to any one of examples 1-8, above.

Each of secondary perimeter shapes 133 being different from each of primary perimeter shapes 132 further enables combined perimeter shape 130 to closely resemble a combination of primary perimeter shapes 132.

Referring generally to, e.g., FIGS. 1B and 3 and particularly to FIG. 1A (Block 524), at least one of secondary perimeter shapes 133 has no symmetry axis. The preceding subject matter of this paragraph characterizes example 10 of the present disclosure, wherein example 10 also includes the subject matter according to any one of examples 1-9, above.

At least one of secondary perimeter shapes 133 having no symmetry axis enables at least one of secondary perimeter shapes 133 to take the form of any asymmetric shape and, thus, allows for flexibility in defining combined perimeter shape 130.

As one example, at least one of secondary perimeter shapes 133 may have any shape suitable to fill a region of combined perimeter shape 130 formed between adjacent primary perimeter shapes 132 and/or between primary perimeter shapes 132 and combined perimeter shape 130.

Referring generally to, e.g., FIGS. 1B, 4, and 5 and particularly to FIG. 1A (Block 526), the step (Block 504) of contiguously laying down prepreg tows 172 to form prepreg composite plies 126 is performed using automated fiber placement machine 236. The preceding subject matter of this paragraph characterizes example 11 of the present disclosure, wherein example 11 also includes the subject matter according to any one of examples 1-10, above.

Use of automated fiber placement machine 236 (FIG. 5) to contiguously lay down prepreg tows 172 (FIG. 5) to form prepreg composite plies 126 (FIG. 5) enables the boundary edges (e.g., the perimeter edges) of precursor combined perimeter shape 174 (FIG. 4) of precursor sheet 128 (FIG. 4) to closely resemble the boundary edges (e.g., the perimeter edges) of combined perimeter shape 130 (FIG. 4), formed by the combination of primary perimeter shapes 132 (FIG. 3), corresponding to perimeter shapes of charges 160 (FIG. 6), and secondary perimeter shapes 133 (FIG. 3).

Automated fiber placement machine 236 (FIG. 5) may include any machine used for the manufacture of complex-shaped structures composed of composite materials. As one example, automated fiber placement is an automated composites manufacturing process of heating and compacting resin pre-impregnated non-metallic fibers on typically complex tooling mandrels. The fiber usually comes in the form of tows (e.g., prepreg tows 172) (FIG. 5). Generally, the tow is a bundle of carbon fibers impregnated with epoxy resin and may range from approximately 0.125 inch to approximately 0.75 inch wide by approximately 0.005 inch to approximately 0.007 inch thick. As one example, the tows may come on a spool.

As one example, automated fiber placement machine 236 (FIG. 5) may have a capacity of four to thirty-two prepreg tows 172 (FIG. 5) or when placing all prepreg tows 172 at a time in a single course, have respective course widths of approximately 1.5 inches to approximately 16 inches. Prepreg tows 172 may be fed to a heater and a compaction roller on a head of automated fiber placement machine 236 and through robotic type machine movements, are placed in courses across a tool or build-up surface.

Courses (e.g., layering) of prepreg tows 172 (FIG. 5) may be generally placed in different angular orientations to build up prepreg composite plies 126 (FIG. 5), which, in combination, have good properties in all directions.

As one example, prepreg composite plies 126 (FIG. 5) are contiguously deposited (e.g., laid down in courses) and laminated together to form precursor sheet 128 (FIG. 4). Each one of charges 160 (FIGS. 6 and 7) is cut from precursor sheet 128.

Prepreg composite plies 126 may include reinforcement fibers. As one example, the reinforcement fibers of approximately fifty percent of prepreg composite plies 126 are parallel to a primary load direction of charges 160 or the article made from charges 160. As one example, the reinforcement fibers of approximately forty percent of prepreg composite plies 126 are at forty-five degrees to the primary load direction of charges 160 or the article made from charges 160. As one example, the reinforcement fibers of approximately ten percent of prepreg composite plies 126 are perpendicular to the primary load direction of charges 160 or the article made from charges.

Varying and/or alternating the orientation of the reinforcing fibers among prepreg composite plies 126 (FIG. 5), with respect to the symmetry axis of each one of charges 160 (FIGS. 6 and 7), at a plurality of different angles, such as approximate angles of 0°, +45°, −45° and 90°, produces optimum mechanical properties (e.g., strength and/or stiffness) in charges 160 and the article formed from charges 160.

Automated fiber placement machine 236 (FIG. 5) may also be capable of cutting individual tows at different times while the automated fiber placement machine 236 is moving, for example, while laying down courses of tows (e.g., prepreg tows 172) (FIG. 5). This may be particularly beneficial when laying up +/−45 degree courses of tows to make plies (e.g., prepreg composite plies 126) (FIG. 5), as automated fiber placement machine 236 can cut a first tow at the desired point of termination and a fraction of a second later cut a second tow, then a third tow, etc. Additionally the tows may start independently of other tows while automated fiber placement machine 236 is moving. This may also be beneficial while laying up the +/−45 degree courses of tows, as the amount of material used is minimized. Additionally, automated fiber placement machine 236 allows for the tows to stop, and start, and stop, and start, etc., all while automated fiber placement machine 236 linearly travels in one (e.g., the same) direction. This may be beneficial, for example, when a laying-up of precursor sheet 128 (FIG. 4) formed from combined perimeter shape 130 (FIGS. 3 and 4) having circumferentially enclosed openings, holes, or gaps.

Referring generally to, e.g., FIGS. 1A, 4, and 6 and particularly to FIG. 1B (Block 528), the step (FIG. 1A, Block 506) of cutting precursor sheet 128 comprises forming derivative sheet 129 by cutting precursor sheet 128 along the boundary edges of combined perimeter shape 130 to remove crenulation scrap 162. The preceding subject matter of this paragraph characterizes example 12 of the present disclosure, wherein example 12 also includes the subject matter according to any one of examples 1-11, above.

Cutting precursor sheet 128 (FIG. 4) along the boundary edges of combined perimeter shape 130 to remove crenulation scrap 162 forms at least part of the boundary edges of one or more of charges 160 (FIG. 6).

Crenulation scrap 162 (FIGS. 4 and 5) is formed during the step (FIG. 1A, Block 504) of contiguously depositing prepreg tows 172 to form prepreg composite plies 126 and laminating prepreg composite plies 126 together to form precursor sheet 128. As illustrated in FIGS. 4 and 5, a portion (e.g., an end portion) of one or more of prepreg tows 172 (FIG. 5) forming one or more prepreg composite plies 126 (FIG. 5) extends beyond the boundary edges of combined perimeter shape 130 (FIG. 4), for example, during the automated fiber placement process by automated fiber placement machine 236 (FIG. 5). As one example, one or more of prepreg tows 172 laid down such that the reinforcing fibers among prepreg composite plies 126 are at different angles with respect to symmetry axes 138 (FIG. 3) primary perimeter shapes 132 form crenulation scrap 162.

Removal (e.g., cutting away) of crenulation scrap 162 (FIG. 4) from precursor sheet 128 (FIG. 4) leaves derivative sheet 129 (FIG. 6). Derivative sheet 129 includes a perimeter shape the same of combined perimeter shape 130 (FIGS. 4 and 6) formed by the geometric combination of primary perimeter shapes 132 (FIG. 3), corresponding to perimeter shapes of charges 160 (FIG. 6), and secondary perimeter shapes 133 (FIG. 4).

Referring generally to, e.g., FIGS. 1A, 4, and 6 and particularly to FIG. 1B, the step (Block 506) of cutting precursor sheet 128 further comprises (Block 530) separating charges 160 from derivative sheet 129 by cutting derivative sheet 129 along scrap cut lines 166. Each one of scrap cut lines 166 (Block 532) comprises a portion perpendicular to symmetry axes 138 of primary perimeter shapes 132. The step (Block 506) of cutting precursor sheet 128 also comprises (Block 534) cutting derivative sheet 129 along charge cut lines 142. Each one of charge cut lines 142 (Block 536) comprises a portion parallel to symmetry axes 138 of primary perimeter shapes 132 and a portion oblique to symmetry axes 138 of primary perimeter shapes 132. Scrap cut lines 166 and the charge cut lines 142 (Block 538) trace outlines of primary perimeter shapes 132 and secondary perimeter shapes 133. The preceding subject matter of this paragraph characterizes example 13 of the present disclosure, wherein example 13 also includes the subject matter according to example 12, above.

Cutting derivative sheet 129 along scrap cut lines 166 and charge cut line 142 optimizes the step of cutting, thereby reducing the number of cuts required to separate all charges 160 from derivative sheet and, thus, reducing the time and cost required to make charges 160.

Cutting derivative sheet 129 along scrap cut lines 166 at least partially separates sheet scrap 164 from derivative sheet 129. Sheet scrap 164 is a portion of derivative sheet 129 defined by at least one of secondary perimeter shapes 132. Cutting derivative sheet 129 along charge cut lines 142 separates charges 160 from derivative sheet 129.

Accordingly, every two cuts of derivative sheet 129 makes one of charges 160. As one example, a single cut along one of charge cut line 142 and a single cut along one of scrap cut line 166 separates one of charges 160 from derivative sheet 129.

Referring to FIG. 1B and with reference to, e.g., FIGS. 1A and 6, Referring generally to, e.g., FIGS. 1A and 6 and particularly to FIG. 1B (Block 540), derivative sheet 129 is cut using device 244 controlled by computer numerical control machine 238. The preceding subject matter of this paragraph characterizes example 14 of the present disclosure, wherein example 14 also includes the subject matter according to any one of examples 12 or 13, above.

Using device 244 controlled by computer numerical control ("CNC") machine 238 automates cutting of derivative sheet 129 and separation of charges 160 from derivative sheet 129.

CNC machine 238 may include any automated machine tool that is operated by precisely programmed commands encoded on a storage medium and controlled by a computer. CNC machine 238 may control motion of device 244 along multiple axes (e.g., X-axis, Y-axis, and/or Z-axis). Device 244 may include any cutting device suitable to cleanly cut through derivative sheet 129.

Referring to FIG. 1B and with reference to, e.g., FIGS. 1A and 6, Referring generally to, e.g., FIGS. 1A and 6 and particularly to FIG. 1B (Block 542), device 244 is ultrasonic cutter 234. The preceding subject matter of this paragraph characterizes example 15 of the present disclosure, wherein example 15 also includes the subject matter according to example 14, above.

Ultrasonic cutter 234 may include any cutting device that vibrates a cutting blade, for example, with an amplitude of approximately 10 μm to approximately 70 μm, in a longitudinal direction to cut material. Ultrasonic cutter 234 may easily cut resin, reinforcing fibers, and composite materials.

As one example, ultrasonic cutter 234 may be advantageous as it separates charges 160 without destroying or otherwise removing any material (e.g., prepreg tows 172 forming prepreg composite plies 126) (FIG. 5), for example, like a saw would. Additionally, ultrasonic cutter 234 may cut prepreg composite plies 126 forming precursor sheet 128 FIG. 4) and/or derivative sheet 129 (FIG. 6) without stickage (commonly known as "gooping up") of a cutting blade, which is a common problem when cutting materials with uncured resins. Because ultrasonic cutter 234 vibrates rapidly, it is almost totally immune to the adverse effects of resin stickage onto a surface of the cutting blade. This minimizes the cleaning required of an edge of the cutting blade of ultrasonic cutter 234.

Referring to FIG. 1B and with reference to, e.g., FIGS. 1A and 6, Referring generally to, e.g., FIGS. 1A and 6 and particularly to FIG. 1B (Block 544), device 244 is mechanical cutter 246. The preceding subject matter of this paragraph characterizes example 16 of the present disclosure, wherein example 16 also includes the subject matter according to example 14, above.

Mechanical cutter 246 may include any cutting device that mechanically rotates or oscillates a cutting blade to cut material. Mechanical cutter 246 may be configured to minimize the amount of material (e.g., prepreg tows 172 forming prepreg composite plies 126) (FIG. 5) that is destroyed or otherwise removed of precursor sheet 128 (FIG. 4) and/or derivative sheet 129 (FIG. 6) during the cutting process.

Referring to FIG. 1B and with reference to, e.g., FIGS. 1A and 6, Referring generally to, e.g., FIGS. 1A and 6 and particularly to FIG. 1B (Block 546), device 244 is laser cutter 248. The preceding subject matter of this paragraph characterizes example 17 of the present disclosure, wherein example 17 also includes the subject matter according to example 14, above.

Laser cutter 248 may include any cutting device that uses a laser to cut material. Laser cutter 248 may be configured to cut without melting the material (e.g., prepreg tows 172 forming prepreg composite plies 126) (FIG. 5) of precursor sheet 128 (FIG. 4) and/or derivative sheet 129 (FIG. 6) during the cutting process.

Referring to FIG. 7, charges 160 comprise base charge 124 comprising first base-charge portion 142, second base-charge portion 144, and transition base-charge portion 146. Transition base-charge portion 146 of base charge 124 tapers from second base-charge portion 144 to first base-charge portion 142. Charges 160 also comprise initial charge 148 comprising first initial-charge portion 150 and transition initial-charge portion 152. First initial-charge portion 150 of initial charge 148 is shaped identically to first base-charge portion 142 of base charge 124. Transition initial-charge portion 152 of initial charge 148 is shaped identically to at least a portion of transition base-charge portion 146 of base charge 124. Charges (160) additionally comprise subsequent charge A comprising first subsequent-charge-A portion and transition subsequent-charge-A portion. First subsequent-charge-A portion of subsequent charge A is shaped identically to first initial-charge portion 150 of initial charge 148. Transition subsequent-charge-A portion of subsequent charge A is smaller than transition initial-charge portion 152 of initial charge 148 and is shaped identically to a portion of transition initial-charge portion 152. The preceding subject matter of this paragraph characterizes example 18 of the present disclosure, wherein example 18 also includes the subject matter according to any one of examples 1-17, above.

A laminated stack of base charge 124, initial charge 148 and subsequent charge A form an integral, continuous part of the article made from charges 160 capable of effectively reacting to loads (e.g., different bending loads) and transferring loads between a first portion of the article and a second portion of the article along a transition portion of the article.

As expressed above, as one example, the manufactured article may at least partially be made from stacking and laminating charges 160 (e.g., base charge 124, initial charge 148 and subsequent charge A). The article may include a first portion having a first cross-sectional profile that is constant along the first portion. The article also may include a second portion having a second cross-sectional profile that is constant along the second portion. The second cross-sectional profile of the second portion is different from the first cross-sectional profile of the first portion. The article also may include a transition portion tapering from the second portion of the article to the first portion of the article.

As one example, base charge 124, initial charge 148 and subsequent charge A being sequentially stacked and laminated at least partially defines a first cross-sectional profile of the first portion of the article made from charges 160 and the transition cross-sectional profiles of the transition portion of the article made from charges 160, and enhance the load-carrying capabilities of the article.

As one example, transition base-charge portion 146 of base charge 124 tapering from second base-charge portion 144 to first base-charge portion 146, transition initial-charge portion 152 of initial charge 148 tapering to first initial-charge portion 150, transition subsequent-charge-A portion of subsequent charge A tapering to first subsequent-charge-A portion gradually reduces the width of the part of the article (e.g., the width of the laminated stack of charges 160) from the second portion to the first portion along the transition portion and provides for a smooth transition from the second portion to the first portion along the transition portion.

Transition initial-charge portion 152 of initial charge 148 being smaller than transition base-charge portion 146 of base charge 124 and transition subsequent-charge-A portion of subsequent charge A being smaller than transition initial-charge portion 152 of initial charge 148 gradually reduces the width of the part of the article (e.g., the width of the laminated stack of charges 160) from base charge 124 to subsequent charge A.

Transition initial-charge portion 152 of initial charge 148 being shaped identically to at least a portion of transition base-charge portion 146 of base charge 124 and first subsequent-charge-A portion of subsequent charge A being shaped identically to first initial-charge portion 150 of initial charge 148 and transition subsequent-charge-A portion of subsequent charge A being smaller than transition initial-charge portion 152 of initial charge 148 and being shaped identically to a portion of transition initial-charge portion 152 gradually increases the combined height of the part of the article (e.g., the combined height of the laminated stack of charges 160) from the second portion to the first portion along the transition portion.

As one example, second base-charge portion 144 of base charge 124 has a generally rectangular two-dimensional ("2D") shape. As used herein, the term "2D shape" refers to a two-dimensional shape in an orthogonal view. First base-charge portion 142 of base charge 124 has a generally rectangular 2D shape. A maximum width of first base-charge portion 142 is smaller than a maximum width of second base-charge portion 144. Transition base-charge portion 146 of base charge 124 has a trapezoidal 2D shape. A maximum width of transition base-charge portion 146 gradually decreases from the maximum width of first base-charge portion 142 to the maximum width of second base-charge portion 144.

As one example, first initial-charge portion 150 of initial charge 148 has a generally rectangular 2D shape. A maximum width of first initial-charge portion 150 is smaller than the maximum width of first base-charge portion 142. Transition initial-charge portion 152 has a generally trapezoidal 2D shape. A maximum width of transition initial-charge portion 152 is smaller than the maximum width of transition base-charge portion 146. A maximum length of transition initial-charge portion 152 may be larger than, equal to, or smaller than a length of transition base-charge portion 146.

As one example, first subsequent-charge-A portion of subsequent charge A has a generally rectangular 2D shape. A maximum width of first subsequent-charge-A portion is smaller than the maximum width of first initial-charge portion 150. Transition subsequent-charge-A portion has a generally trapezoidal 2D shape. A maximum width of transition subsequent-charge-A portion is smaller than the maximum width of transition initial-charge portion 152. A maximum length of transition subsequent-charge-A portion is less than the maximum length of transition initial-charge portion 152.

As one example, base charge 124, initial charge 148, and subsequent charge A each have a trapezoidal cross-sectional shape (e.g., a cross-section taken perpendicular to the axis of symmetry). As one example, when cutting precursor sheet 128 (FIG. 1B, Block 506) to separate (FIG. 1B, Blocks 530 and 534) charges 160 (e.g., base charge 124, initial charge 148, and subsequent charge A), for example, with device 244 (FIG. 6), the cuts made along charge cut lines 142 (FIG. 6) and scrap cut lines 166 (FIG. 6) may be made at a non-zero angle (e.g., a forty-five degree angle) relative to a plane normal to precursor sheet 128.

Thus, as one example, the stack of transition base-charge portion 146 of base charge 124, transition initial-charge portion 152 of initial charge 148, and transition subsequent-charge-A portion of subsequent charge A has a trapezoidal cross-sectional shape. Similarly, as one example, the stack of first base-charge portion 142 of base charge 124, first initial-charge portion 150 of initial charge 148, and first subsequent-charge-A portion of subsequent charge A has a trapezoidal cross-sectional shape.

Referring to FIG. 7, charges 160 further comprise subsequent charge B comprising first subsequent-charge-B portion and transition subsequent-charge-B portion. First subsequent-charge-B portion of subsequent charge B is shaped identically to first subsequent-charge-A portion of subsequent charge A. Transition subsequent-charge-B portion of subsequent charge B is smaller than transition subsequent-charge-A portion of subsequent charge A and is shaped identically to a portion of transition subsequent-charge-A portion. The preceding subject matter of this paragraph characterizes example 19 of the present disclosure, wherein example 19 also includes the subject matter according to example 18, above.

Subsequent charge B being stacked and laminated onto subsequent charge A further increases the combined height of the article made from charges 160, further partially defines the first cross-sectional profile of the first portion of the article and the transition cross-sectional profiles of the transition portion of the article, and enhances the load-carrying capabilities of the article made from charges 160.

As one example, first subsequent-charge-B portion of subsequent charge B has a generally rectangular 2D shape. A maximum width of first subsequent-charge-B portion is smaller than the maximum width of first subsequent-charge-A portion. Transition subsequent-charge-B portion has a generally trapezoidal 2D shape. A maximum width of transition subsequent-charge-B portion is smaller than the maximum width of transition subsequent-charge-A portion. A maximum length of transition subsequent-charge-B portion is less than the maximum length of transition subsequent-charge-A portion.

As one example, transition subsequent-charge-B has a trapezoidal cross-sectional shape. Thus, as one example, the stack of transition base-charge portion 146 of base charge 124, transition initial-charge portion 152 of initial charge 148, transition subsequent-charge-A portion of subsequent charge A, and transition subsequent-charge-B portion of subsequent charge B has a trapezoidal cross-sectional shape. Similarly, as one example, the stack of first base-charge portion 142 of base charge 124, first initial-charge portion 150 of initial charge 148, first subsequent-charge-A portion of subsequent charge A, and first subsequent-charge-B portion of subsequent charge B has a trapezoidal cross-sectional shape.

Referring to FIG. 7, charges 160 further comprise subsequent charges B through N, subsequent charges B through N respectively comprise first subsequent-charge-B-through-N portions and transition subsequent-charge-B-through-N portions. First subsequent-charge-B-through-N portions of subsequent charges B through N are shaped identically to first subsequent-charge-A portion of subsequent charge A. Transition subsequent-charge-B-through-N portions of subsequent charges B through N are smaller than transition subsequent-charge-A portion of subsequent charge A. Each one of transition subsequent-charge-B-through-N portions of subsequent charges B through N is smaller than a preceding one of transition subsequent-charge-B-through-N portions of subsequent charges B through N. Each one of transition subsequent-charge-B-through-N portions of subsequent charges B through N is shaped identically to a portion of transition subsequent-charge-A portion. The preceding subject matter of this paragraph characterizes example 20 of the present disclosure, wherein example 20 also includes the subject matter according to example 18, above.

Subsequent charges B through N being sequentially stacked and laminated onto subsequent charge A further increases the combined height of the article made from charges 160, further partially defines first cross-sectional profile of the first portion of the article and the transition cross-sectional profiles of the transition portion of the article, and enhances the load-carrying capabilities of the article.

As one example, each one of first subsequent-charge-B-through-N portions of subsequent charges B through N has a generally rectangular 2D shape. A maximum width of each one of first subsequent-charge-B-through-N portions is smaller than the maximum width of first subsequent-charge-A portion and a maximum width of a preceding one of first subsequent-charge-B-through-N portions. Each one of transition subsequent-charge-B-through-N portions of subsequent charges B through N has a generally trapezoidal 2D shape. A maximum width of each one of transition subsequent-charge-B-through-N portions is smaller than the maximum width of transition subsequent-charge-A portion and a maximum width of a preceding one of first subsequent-charge-B-through-N portions. A maximum length of each one of transition subsequent-charge-B-through-N portions is less than the maximum length of transition subsequent-charge-A portion and a maximum length of a preceding one of first subsequent-charge-B-through-N portions.

As one example, each one of transition subsequent-charge-B-through-N portions of subsequent charges B through N has a trapezoidal cross-sectional shape. Thus, as one example, the stack of transition base-charge portion 146 of base charge 124, transition initial-charge portion 152 of initial charge 148, transition subsequent-charge-A portion of subsequent charge A, and transition subsequent-charge-B-through-N portions of subsequent charges B through N has a trapezoidal cross-sectional shape. Similarly, as one example, the stack of first base-charge portion 142 of base charge 124, first initial-charge portion 150 of initial charge 148, first subsequent-charge-A portion of subsequent charge A, and first subsequent-charge-B-through-N portions of subsequent charges B through N has a trapezoidal cross-sectional shape.

Examples of the present disclosure may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of making charges, the method comprising:
forming a combined perimeter shape having no circumferentially enclosed openings by geometrically combining primary perimeter shapes, corresponding to perimeter shapes of the charges, and secondary perimeter shapes, such that symmetry axes of the primary perimeter shapes are parallel to each other, lateral edges of the primary perimeter shapes, adjacent to each other, are at least partially contiguous, and all boundary edges of the combined perimeter shape are either parallel or perpendicular to the symmetry axes of the primary perimeter shapes;
contiguously depositing prepreg tows to form prepreg composite plies and laminating the prepreg composite plies together to form a precursor sheet having a precursor combined perimeter shape that circumscribes the combined perimeter shape; and
cutting the precursor sheet.

2. The method according to claim 1, wherein the precursor combined perimeter shape is larger than the combined perimeter shape by at most thirty percent.

3. The method according to claim 1, wherein the precursor combined perimeter shape is larger than the combined perimeter shape by at most fifteen percent.

4. The method according to claim 1, wherein the precursor combined perimeter shape is larger than the combined perimeter shape by at most five percent.

5. The method according to claim 1, wherein all the primary perimeter shapes are different from one another.

6. The method according to claim 1, wherein at least one of the primary perimeter shapes is different from at least another one of the primary perimeter shapes.

7. The method according to claim 1, wherein each of the primary perimeter shapes has only one symmetry axis.

8. The method according to claim 1, wherein all of the secondary perimeter shapes are different from one another.

9. The method according to claim 1, wherein each of the secondary perimeter shapes is different from each of the primary perimeter shapes.

10. The method according to claim 1, wherein at least one of the secondary perimeter shapes has no symmetry axis.

11. The method according claim 1, wherein the step of contiguously laying down prepreg tows to form the prepreg composite plies is performed using an automated fiber placement machine.

12. The method according claim 1, wherein cutting the precursor sheet comprises forming a derivative sheet by cutting the precursor sheet along the boundary edges of the combined perimeter.

13. The method according to claim 12, wherein cutting the precursor sheet further comprises separating the charges from the derivative sheet by:
cutting the derivative sheet along scrap cut lines, wherein each one of the scrap cut lines comprises a portion perpendicular to the symmetry axes of the primary perimeter shapes; and
cutting the derivative sheet along charge cut lines, wherein each one of the charge cut lines comprises a portion parallel to the symmetry axes of the primary perimeter shapes and a portion oblique to the symmetry axes of the primary perimeter shapes,
wherein the scrap cut lines and the charge cut lines trace outlines of the primary perimeter shapes and the secondary perimeter shapes.

14. The method according to claim 12, wherein the derivative sheet is cut using a device controlled by a computer numerical control machine.

15. The method according to claim 14, wherein the device is an ultrasonic cutter.

16. The method according to claim 14, wherein the device is a mechanical cutter.

17. The method according to claim 14, wherein the device is a laser cutter.

18. The method according to claim 1, wherein the charges comprise:
a base charge comprising a first base-charge portion, a second base-charge portion, and a transition base-charge portion, wherein the transition base-charge portion of the base charge tapers from the second base-charge portion to the first base-charge portion;
an initial charge comprising a first initial-charge portion and a transition initial-charge portion, wherein:
the first initial-charge portion (150) of the initial charge is shaped identically to the first base-charge portion of the base charge, and
the transition initial-charge portion of the initial charge is shaped identically to at least a portion of the transition base-charge portion of the base charge; and
a subsequent charge A comprising a first subsequent-charge-A portion and a transition subsequent-charge-A portion, wherein:
the first subsequent-charge-A portion of the subsequent charge A is shaped identically to the first initial-charge portion of the initial charge, and
the transition subsequent-charge-A portion of the subsequent charge A is smaller than the transition initial-charge portion of the initial charge and is shaped identically to a portion of the transition initial-charge portion.

19. The method according to claim 18, wherein the charges further comprise a subsequent charge B comprising a first subsequent-charge-B portion and a transition subsequent-charge-B portion, wherein:
the first subsequent-charge-B portion of the subsequent charge B is shaped identically to the first subsequent-charge-A portion of the subsequent charge A, and
the transition subsequent-charge-B portion of the subsequent charge B is smaller than the transition subsequent-charge-A portion of the subsequent charge A and is shaped identically to a portion of the transition subsequent-charge-A portion.

20. The method according to claim 18, wherein the charges further comprise subsequent charges B through N, the subsequent charges B through N respectively comprising first subsequent-charge-B-through-N portions and transition subsequent-charge-B-through-N portions, wherein:
the first subsequent-charge- B-through-N portions of the subsequent charges B through N are shaped identically to the first subsequent-charge-A portion of the subsequent charge A,
the transition subsequent-charge-B-through-N portions of the subsequent charges B through N are smaller than the transition subsequent-charge-A portion of the subsequent charge A,
each one of the transition subsequent-charge-B-through-N portions of the subsequent charges B through N is smaller than a preceding one of the transition subsequent-charge-B-through-N portions of the subsequent charges B through N, and each one of the transition subsequent-charge-B-through-N portions of the subsequent charges B through N is shaped identically to a portion of the transition subsequent-charge-A portion.

\* \* \* \* \*